United States Patent
Degand et al.

(10) Patent No.: US 6,858,305 B2
(45) Date of Patent: Feb. 22, 2005

(54) ORGANIC GLASS OPHTHALMIC LENS HAVING AN IMPACT-RESISTANT PRIMER LAYER BASED ON A POLYURETHANE LATEX AND ITS MANUFACTURING PROCESS

(75) Inventors: Jean-Pierre Degand, Paris (FR); Anne Robert, Villecresne (FR)

(73) Assignee: Essilor International Compagnie Generale d'Optique, Charenton Cedex (FR)

( * ) Notice: Subject to any disclaimer, the term of this patent is extended or adjusted under 35 U.S.C. 154(b) by 717 days.

(21) Appl. No.: 09/774,328

(22) Filed: Jan. 30, 2001

(65) Prior Publication Data

US 2002/0071091 A1 Jun. 13, 2002

Related U.S. Application Data

(63) Continuation of application No. PCT/FR99/01887, filed on Jul. 30, 1999.

(30) Foreign Application Priority Data

Jul. 31, 1998 (FR) ............................................. 98 09826

(51) Int. Cl.⁷ ......................... B32B 27/40; B32B 27/30; B32B 27/26; B05D 3/02; B05D 1/38

(52) U.S. Cl. .................... 428/423.1; 428/523; 427/162; 427/164; 427/385.5; 427/402

(58) Field of Search .............................. 428/423.1, 447, 428/448, 523; 427/162, 164, 372.2, 384, 385.5, 389.7, 393.5, 402, 407.1

(56) References Cited

U.S. PATENT DOCUMENTS 5,316,791 A * 5/1994 Farber et al. ................ 427/164
6,489,028 B1 * 12/2002 Degand et al. ........... 428/423.1
6,503,631 B1 * 1/2003 Faverolle et al. ............ 428/447

FOREIGN PATENT DOCUMENTS

| EP | 0 615 788 | 9/1994 |
| JP | 06 043303 | 2/1994 |
| JP | 08 248204 | 9/1996 |

* cited by examiner

*Primary Examiner*—Philip C. Tucker
*Assistant Examiner*—Michael J Feely
(74) *Attorney, Agent, or Firm*—Fulbright & Jaworski L.L.P.

(57) ABSTRACT

The present invention relates to an organic glass ophthalmic lens having an impact-resistant primer layer based on a polyurethane latex and its manufacturing process.

24 Claims, No Drawings

ORGANIC GLASS OPHTHALMIC LENS HAVING AN IMPACT-RESISTANT PRIMER LAYER BASED ON A POLYURETHANE LATEX AND ITS MANUFACTURING PROCESS

This application is a continuation of PCT Application No. PCT/FR99/01887 filed 30 Jul. 1999, which claims priority to French Application No. 98 09826 filed 31 Jul. 1998.

The present invention relates to an organic glass ophthalmic lens having an impact-resistant primer layer based on a polyurethane latex and its manufacturing process.

Organic glass ophthalmic lenses are more sensitive to scratching and abrasion than inorganic glass lenses.

It is known to protect the surface of organic glass lenses by means of hard (abrasion-resistant) coatings generally based on a polysiloxane.

It is also known to treat organic glass lenses so as to prevent the formation of spurious reflections which cause problems for the person wearing the lens and his interlocutors. The lens is then provided with a monolayer or multilayer anti-reflection coating, generally made of an inorganic material.

When the lens includes an abrasion-resistant hard coating in its structure, the anti-reflection coating is deposited on the surface of the abrasion-resistant layer. Such a stack reduces the impact resistance by stiffening the system, which then becomes brittle. This problem is well known in the organic glass ophthalmic lens industry.

To remedy this drawback, it has been proposed to place an impact-resistant primer layer between the organic glass lens and the abrasion-resistant hard coating.

Thus, Japanese Patents 63-141001 and 63-87223 describe organic glass lenses having an impact-resistant primer based on a thermoplastic polyurethane resin. U.S. Pat. No. 5,015,523 recommends the use of acrylic impact-resistant primers, whereas European Patent EP-0,404,111 describes the use of impact-resistant primers based on a thermosetting polyurethane.

Document U.S. Pat. No. 5,316,791 recommends the use of an impact-resistant primer layer formed from an aqueous dispersion of polyurethane applied directly to one surface of the organic glass substrate. In order to form the impact-resistant primer layer, the aqueous dispersion is dried and cured in air at room temperature (21–27° C.).

The processes and primers of the prior art are not entirely satisfactory.

In particular, it is desirable:
to improve the cosmetic appearance of glasses, that is to say to remove any optical imperfection (streaks or craters visible to the naked eye);
to provide an easier and quicker method of implementation
in particular, Patent U.S. Pat. No. 5,316,791 mentions quite short times (about 15 minutes) for curing the primer at room temperature, however, in practice, it turns out that the primer cure times are excessively long (up to several days).

The Applicant has just discovered, unexpectedly, that the use of latex compositions containing at least one polyurethane latex and a polyurethane crosslinking agent, but being free of any latex which includes butadiene units, made it possible to obtain impact-resistant primer layers between an organic glass substrate and an abrasion-resistant hard coating, possibly coated with an anti-reflection coating, having the desired impact-resistance and cosmetic properties and the index of which impact-resistant primer layers may moreover, if required, be easily matched to the refractive index of the organic glass, without impairing the abrasion-resistance and anti-reflection properties of the abrasion-resistant and anti-reflection coatings.

The subject of the present invention is therefore an ophthalmic lens comprising an organic glass substrate, at least one abrasion-resistant coating and at least one impact-resistant primer layer inserted between the organic glass and the abrasion-resistant coating, the impact-resistant primer layer of which is formed from a latex composition comprising at least one polyurethane latex and a polyurethane crosslinking agent and being free of any latex which includes butadiene units.

Another subject of the invention relates to a process for manufacturing this lens.

As is well known, latices are stable dispersions of a polymer in an aqueous medium.

The latex compositions of the present invention may consist just of one or more polyurethane latices or may also consist of one or more polyurethane latices mixed with one or more other latices which do not include butadiene units, in particular (meth)acrylic latices.

The latices used preferably have a solids content of 30 to 70% by weight.

The polyurethane latices are well known and are commercially available.

The preferred polyurethane latices are polyurethane latices containing polyester units.

Such polyurethane latices may be obtained from Zeneca Resins under the name NEOREZ®.

Also well known are (meth)acrylic (ACM) latices.

Poly(meth)acrylic latices are latices of copolymers consisting mainly of a (meth)acrylate such as, for example, ethyl or butyl or methoxy or ethoxyethyl (meth)acrylate with a generally minor proportion of at least one other comonomer such as, for example, styrene.

The poly(meth)acrylic latices recommended in the latex compositions according to the invention are styrene-acrylate copolymer latices.

Such styrene-acrylate copolymer latices are commercially available from Zeneca Resins under the name NEOCRYL®.

When it is present, the (meth)acrylic latex or the mixture of (meth)acrylic latices generally represents 10 to 90%, preferably 10 to 60% and even better 40 to 60% of the total weight of the latices present in the composition.

Another essential constituent of the latex compositions according to the invention is the polyurethane crosslinking agent. Polyurethane crosslinking agents are well known and among these mention may be made of polyfunctional aziridines, (methoxymethyl)melamine resins or urea resins, for example (methoxymethyl)melamine-formaldehyde and urea-formaldehyde resins, carbodiimides, polyisocyanates and blocked polyisocyanates. The preferred crosslinking agents are aziridines, particularly trifunctional aziridines.

A recommended aziridine derivative is sold under the name CX 100 by Zeneca Resins.

The amount of crosslinking agent in the latex compositions according to the invention is generally from 0.1 to 5%, preferably about 3%, by weight with respect to the total weight of the latex solution in the composition.

In the present document, unless otherwise indicated the percentages of latex by weight represent the percentages of the latex solutions incorporated into the compositions, including the weight of water and the weight of any solvents in these solutions.

The latex compositions according to the invention may include any ingredient conventionally used in primer layers for the adhesion of an abrasion-resistant coating to organic glass ophthalmic lenses. In particular, they may include an antioxidant, a UV absorber or a surfactant, in the proportions conventionally used.

As surfactants, BAYSILONE OL 31 and FC 430, which are sold by 3M, or SILWET LS 7657, L 7604 or L 77, from OSI Specialities, may be used.

The amount of surfactant used is generally from 0 to 1% by weight with respect to the total weight of the latices present in the composition.

In general, the solids content of the latices in the compositions of the invention varies from 5 to 40% by weight, preferably 7–35% by weight, and even better about 10 to 30% by weight of the composition.

The latex compositions according to the invention may include a UV absorber in proportions varying from 0 to 10% by weight, preferably from 0 to 5% by weight and even better about 2.5% by weight of active material.

The UV absorber is preferably chosen so as to be soluble or easily dispersible in aqueous solution.

As UV absorber, it will be preferred to use a UV absorber of the benzimidazole type, and preferably of the type having a sulphonate functional group. By way of example of such a UV absorber, mention may be made of PARSOL HS, which is the sodium salt of the following sulphonic acid

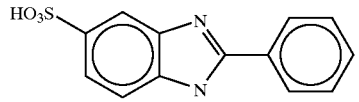

sold by Givaudan.

The substrates of the lenses according to the present invention are all organic glass substrates normally used for organic ophthalmic lenses.

Among the substrates suitable for the lenses according to the invention, mention may be made of substrates obtained by polymerization of alkyl (meth)acrylates, particularly $C_1$–$C_4$ alkyl(meth)acrylates such as methyl (meth)acrylate and ethyl (meth)acrylate, allyl derivatives such as linear or branched, aliphatic or aromatic polyol allyl carbonates, thio-(meth)acrylics, thiourethanes and polyethoxylated aromatic (meth)acrylates such as polyethoxylated bisphenol A dimethacrylates.

Among the recommended substrates, mention may be made of substrates obtained by the polymerization of polyol allyl carbonates, among which may be mentioned ethylene glycol bis(allyl carbonate), diethylene glycol bis(2-methyl carbonate), diethylene glycol bis(allyl carbonate), ethylene glycol bis(2-chloroallyl carbonate) triethylene glycol bis (allyl carbonate), 1,3-propanediol bis(allyl carbonate), propylene glycol bis(2-ethylallyl carbonate), 1,3-butanediol bis (allyl carbonate), 1,4-butanediol bis (2-bromoallyl carbonate), dipropylene glycol bis(allyl carbonate), trimethylene glycol bis(2-ethyl allyl carbonate), pentamethylene glycol bis(allyl carbonate) and isopropylene bisphenol A bis(allyl carbonate).

The substrates particularly recommended are the substrates obtained by the polymerization of diethylene glycol bis(allyl carbonate) sold under the brand name CR 39® by PPG Industrie (ORMA® lens from Essilor).

Among the substrates also recommended, mention may be made of the substrates obtained by the polymerization of thio(meth)acrylic monomers such as those described in French Patent Application FR-A-2,734,827.

Of course, the substrates may be obtained by the polymerization of mixtures of the above monomers.

The abrasion-resistant hard coatings of the ophthalmic lenses according to the invention may be any abrasion-resistant coating known in the field of ophthalmic optics.

Among the abrasion-resistant hard coatings recommended in the present invention, mention may be made of coatings obtained from compositions based on a silane hydrolysate, particularly an epoxy silane hydrolysate, such as those described in French Patent Application No. 93/02649.

A preferred abrasion-resistant hard coating composition comprises, with respect to the total weight of the composition, approximately 22% of glycidoxypropylmethyldimethoxysilane, 62% of colloidal silica with a solids content of 30% and 0.7% of aluminium acetylacetonate (a catalyst), the balance essentially consisting of the solvents conventionally used for fomulating such compositions.

As indicated above, the ophthalmic lens according to the invention may furthermore include an anti-reflection coating deposited on the abrasion-resistant coating.

By way of example, the anti-reflection coating may consist of a monolayer or multilayer film of dielectric materials such as SiO, $SiO_2$, $Si_3N_4$, $TiO_2$, $ZrO_2$, $Al_2O_3$, $MgF_2$ or $Ta_2O_5$ or their mixtures. In this way, it becomes possible to prevent the appearance of a reflection at the lens/air interface.

This anti-reflection coating is generally applied by vacuum deposition using one of the following techniques:

1/by evaporation, possibly assisted by an ion beam;
2/by ion beam sputtering;
3/by cathodic sputtering;
4/by plasma-enhanced chemical vapour deposition.

Apart from vacuum deposition, it is also conceivable for an inorganic layer to be deposited by the sol-gel route (for example, using tetraethoxysilane hydrolysates).

If the film comprises a single layer, its optical thickness must be equal to $\lambda/4$ where $\lambda$ is a wavelength lying between 450 and 650 nm.

In the case of a multilayer film comprising three layers, a combination corresponding to respective optical thicknesses of $\lambda/4$-$\lambda/2$-$\lambda/4$ or $\lambda/4$-$\lambda/4$-$\lambda/4$ may be used.

It is also possible to use an equivalent film formed by more layers, instead of any of the layers forming part of the three aforementioned layers.

The ophthalmic lenses according to the invention may consist of an organic glass substrate coated on its rear face or its front face with an impact-resistant primer interlayer according to the invention, with an abrasion-resistant coating deposited on the primer layer and optionally with an anti-reflection coating on the abrasion-resistant coating.

The substrate may also be coated on both faces with an impact-resistant primer layer according to the invention, with an abrasion-resistant coating and optionally with an anti-reflection coating.

The preferred ophthalmic lenses according to the invention have a single impact-resistant primer layer deposited on the rear face of the lens and, on each of the faces, an abrasion-resistant coating and an anti-reflection coating applied to the abrasion-resistant coating.

For example, such a lens is obtained by depositing a layer of the latex composition on the rear face of the lens by centrifuging. The layer is then cured at a temperature of at least 70° C. in order to form the impact-resistant primer layer. The cure temperature of the primer may vary from 70° C. to 140° C., but it is preferably about 90° C., the cure time varying from several hours to a few minutes, but generally being approximately 1 hour. Next, the abrasion-resistant hard coating is applied to both faces of the lens by dip coating. Finally, after this hard coating has cured, an anti-reflection coating is applied to both faces of the lens.

An ophthalmic lens obtained in this way exhibits excellent abrasion resistance on its front face, this being more exposed to stresses when the user is handling his spectacles, and excellent impact resistance.

According to the present invention, the thickness of the impact-resistant primer layer obtained after curing is preferably between 0.2 and 2.5 μm and more particularly between 0.5 and 1.5 μm.

As regards the thickness of the abrasion-resistant coating, this is generally between 1 and 10 μm and more particularly between 2 and 6 μm.

The subject of the present invention is therefore also a process for manufacturing a lens comprising an organic glass substrate, at least one abrasion-resistant hard coating, optionally covered with an anti-reflection coating, and at least one impact-resistant primer layer inserted between the substrate and the abrasion-resistant coating, the process comprising:

depositing, for example by centrifuging, a layer of a latex composition as defined above on at least one face of the substrate;

curing this latex composition at a temperature of at least 70° C. in order to form the impact-resistant primer layer or layers;

depositing an abrasion-resistant hard coating on the impact-resistant primer layer or layers formed; and optionally, depositing an anti-reflection coating on the abrasion-resistant hard coating or coatings.

The following examples illustrate the present invention.

In the examples, unless otherwise indicated all percentages and parts are expressed by weight.

COMPARATIVE EXAMPLES A TO C AND EXAMPLES 1 TO 7

The latex compositions according to the invention indicated in Table I below, and modified by diluting them so as to obtain the desired viscosity, were deposited by centrifuging (1500 revolutions per minute for 10 to 15 seconds) on the rear face of organic glass lenses (ORMA® made of CR 39® from Essilor).

The latex compositions were then cured at 90° C. for 1 hour in order to obtain impact-resistant primer layers having the thicknesses indicated in Table I.

After cooling, an abrasion-resistant coating was deposited on the faces of each of the lenses by dip coating and cured for 1 hour at 90° C.

The abrasion-resistant composition comprised, with respect to the total weight of the composition, 22% of glycidoxypropylmethyldimethoxysilane, 62% of colloidal silica, containing 30% solids in methanol, and 0.70% of aluminium acetylacetonate (a catalyst), the balance essentially consisting of water and conventional solvents.

The thicknesses of the abrasion-resistant layers are also given in Table I.

The lenses coated with the impact-resistant primer layer and with the abrasion-resistant coating were then subjected to an anti-reflection treatment by vacuum evaporation (the coating being deposited on both faces of each lens.

The anti-reflection coating on the abrasion-resistant coating was obtained by vacuum deposition:

of a first layer based on zirconium titanium oxide;

of a second layer based on $SiO_2$;

the optical thickness in the case of both these layers taken together being approximately $\lambda/4$;

of a third layer based on $TiO_2$, with an optical thickness of $\lambda/2$; and of a fourth layer based on $SiO_2$, with an optical thickness of $\lambda/4$.

The abrasion resistance was evaluated by determining the Bayer value on substrates coated with the impact-resistant primer layer and with the abrasion-resistant coating. This Bayer value was determined in accordance with the ASTM F 735.81 standard.

The impact resistance of the ophthalmic lenses obtained was determined on the substrates coated with the primer layer, the abrasion-resistant coating layer and the anti-reflection coating in accordance with the falling-ball test. In this test, balls are dropped with increasing energy onto the centre of the coated glass until starring or fracturing of the latter occurs. The minimum energy used in this test is 15.2 g/meter (corresponding to the first fall height). This energy is 200 mJ and corresponds to the minimum value imposed by the United States FDA. The mean fracture energy of the coated substrate is then calculated.

The glass exhibits good cosmetic quality (X) if it successfully passes the following 3 checks:

1) Examination of the lens with the naked eye in transmission, using a conventional neon lamp: the glass must not exhibit any defects, particularly there should be no craters, bright spots or scratches;

2) Examination of the glass with the naked eye in reflection: the glass must not exhibit any defects, particularly there should be no streaks formed during the polymerization;

3) Examination of the glass with the eye by means of an arc lamp in transmission.

The glass must not exhibit any defects.

The test allows the presence of any streaks in the latex layer and the abrasion-resistant varnish layer to be revealed.

The results are given in Table I

TABLE I

| | Composition of the latex | | | | | | | | Abrasion- | |
| | PU Latex | | (Meth)acrylic latex | | Crosslinking agent | | Primer | | resistant | |
| Example No. | Type | % by weight | Type | % by weight | Type | % by weight | thickness (μm) | Fracture energy (mJ) | Bayer | thickness (μm) | Cosmetic quality |
| --- | --- | --- | --- | --- | --- | --- | --- | --- | --- | --- | --- |
| A | R961 | 100 | — | — | — | — | 1.0 | 1600 ± 500 | 2.2 or 1.0 + 0.1 | 3.5 | Scattering (not checked) |
| B | — | — | A623 | 100 | CX 100 | 3 | 2.2 | 800 ± 200 | 1.6 ± 0.1 | 4.4 | X |
| C | — | — | A639 | 100 | CX 100 | 3 | 0.8 | 800 ± 200 | 1.3 ± 0.1 | 2.7 | X |
| 1 | R962 | 100 | — | — | CX 100 | 3 | 1 | 1200 ± 350 | 0.8 ± 0.1 | 2.5 | X |

TABLE I-continued

| | Composition of the latex | | | | | | Primer | | | Abrasion-resistant | |
| | PU Latex | | (Meth)acrylic latex | | Crosslinking agent | | | | | | |
| Example No. | Type | % by weight | Type | % by weight | Type | % by weight | thickness (μm) | Fracture energy (mJ) | Bayer | thickness (μm) | Cosmetic quality |
|---|---|---|---|---|---|---|---|---|---|---|---|
| 2 | W234 | 100 | — | — | CX 100 | 3 | 1.3 | 1900 ± 600 | 0.8 ± 0.1 | 2.2 | X |
| 3 | W234 | 50 | A639 | 50 | CX 100 | 3 | 0.9 | 1100 ± 250 | 2.0 ± 0.1 | 3 | X |
| 4 | W970 | 50 | A639 | 50 | CX 100 | 3 | 0.9 | 1200 ± 200 | 1.0 ± 0.1 | 2.7 | X |
| 5 | R961 | 66.6 | A623 | 33.3 | CX 100 | 3 | 0.8 | 900 ± 220 | 1.5 ± 0.1 | 1.95 | X |
| 6 | R972 | 40 | A639 | 60 | CX 100 | 3 | 1 | 1100 ± 400 | 2.0 ± 0.1 | 1.9 | X |
| 7 | R974 | 40 | A639 | 60 | CX 100 | 3 | 1 | 1100 ± 400 | 1.8 ± 0.1 | 1.9 | X |

X = good cosmetic quality

Nature and characteristics of the latices used (Suppliers' Data)

| Nature of the primer | Type of aqueous dispersion | % by weight of solids | % by weight of N-methyl-pyrrolidone (solvent) | Viscosity at 25° C. (mPa · s) |
|---|---|---|---|---|
| NEOREZ R961 (1) | aliphatic PU (PES) | 34 | 17 | 300 |
| NEOREZ R962 (1) | aliphatic PU (PES) | 34 | 17 | 225 |
| NEOREZ R972 (1) | aliphatic PU (PES) | 34 | 9 | 100 |
| NEOREZ R974 (1) | aliphatic PU (PES) | 40 | 4 | 300 |
| NEOCRYL A623 (1) | styrene/acrylic | 35 | 10.6 (butyl glycol) | 100 |
| NEOCRYL A639 (1) | styrene/acrylic | 45 | — | 200 |
| W 231 (2) | aliphatic PU (PES) | 30 | 12.2 | 100 |
| W 234 (2) | aliphatic PU (PES) | 30 | 9.6 | 100 |
| W 755 (2) | aliphatic PU (PES) | 60 | — | 100 |
| W 781 (2) | aliphatic PU (PES) | 40 | — | 150 |
| W 790 (2) | aliphatic PU (PES) | 40 | 9.8 | 100 |

Suppliers: Zeneca (1); Baxenden (2).
aliphatic PU (PES) = polyurethane containing aliphatic polyester units.

The aqueous dispersions (latices) are diluted with water in order to obtain the desired viscosity. For centrifugal coating at 1500 revolutions/minute for 10 to 15 seconds, the viscosity is adjusted, by diluting in water, generally to about 50%, in order to obtain a primer layer approximately 1 μm in thickness.

In the case of dip coating, the composition will generally comprise 30% latex and 70% water.

The rate of dewetting is generally 12 cm/minute.

The above examples show that, by using the latex compositions according to the invention, impact-resistant primer layers are obtained which improve the impact resistance of lenses without impairing the cosmetic quality of the lens.

EXAMPLES 8 TO 12

Lenses as described in the above examples were produced, but by varying, in the latices used, the proportion of polyurethane latex and (meth)acrylic latex. The latex compositions and the results obtained are given in Table II. All the latex compositions contained 3% by weight of crosslinking agent CX 100 and the primer layers all had a thickness of 3.5 μm.

TABLE II

| Example No. | Latex composition % by weight | | Lens central thickness mm | Fracture energy mJ | Bayer | Cosmetic quality |
|---|---|---|---|---|---|---|
| | R 961 | A 631 | | | | |
| 8 | 90 | 10 | 2.04 | 1170 ± 230 | 1.7 | X |
| 9 | 80 | 20 | 2.04 | 930 ± 220 | 1.9 | X |
| 10 | 70 | 30 | 1.88 | 780 ± 240 | 1.8 | X |
| 11 | 60 | 40 | 1.9 | 820 ± 160 | 2.0 | X |
| 12 | 50 | 50 | 2.01 | 800 ± 200 | 2.0 | X |
| 13 | 40 | 60 | 2.04 | 880 ± 170 | 1.9 | X |

X = good cosmetic quality

All the primer layers according to the invention pass the isopropyl alcohol resistance test. In this test, a CEMOI® industrial glass-wipe soaked in isopropyl alchohol is applied between the index finger and the surface of the organic glass coated with the primer layer. Three to-and-fro movements are made with the index finger over a total distance of about 2.5 cm, while exerting a pressure of approximately 200 g. The resistance of the primer layer is evaluated visually in transmission using an arc lamp or by measuring the thickness of the layer. The fact that the primer layers according to the invention pass this test allows the lenses coated with the primer layer to be stored before the abrasion-resistant hard coating is deposited.

The above examples show that impact-resistant primer layers are obtained which result in a particularly good compromise between the impact resistance and abrasion resistance properties using mixtures of polyurethane latices and acrylic latices according to the invention.

What is claimed is:

1. An ophthalmic lens comprising an organic glass substrate, at least one abrasion-resistant coating and at least one impact-resistant primer layer inserted between the organic glass substrate and the abrasion-resistant coating, wherein the impact-resistant primer layer is formed from a latex composition comprising at least one polyurethane latex and at least one polyurethane crosslinking agent and is free of latex that includes butadiene units.

2. The ophthalmic lens of claim 1, wherein the latex composition is further defined as comprising at least one (meth)acrylic latex.

3. The ophthalmic lens of claim 2, wherein the (meth)acrylic latex form 10 to 90% total weight of latex present in the latex composition.

4. The ophthalmic lens of claim 3, wherein the (meth)acrylic latex form 10 to 60% total weight of latex present in the latex composition.

5. The ophthalmic lens of claim 4, wherein the (meth)acrylic latex form 40 to 60% total weight of latex present in the latex composition.

6. The ophthalmic lens of claim 3, wherein the (meth)acrylic latex comprises styrene-acrylate copolymer latex.

7. The ophthalmic lens of claim 1, wherein the crosslinking agent comprises 0.1 to 5% by weight of the latex composition.

8. The ophthalmic lens of claim 1, wherein the crosslinking agent comprises at least one polyfunctional aziridine, (methoxymethyl)melamine resin, urea resin, carbodiimide, polyisocyanate, or blocked polyisocyanates.

9. The ophthalmic lens of claim 1, further defined as comprising a single primer layer on either the rear face of the substrate or the front face of the substrate.

10. The ophthalmic lens of claim 9, further defined as comprising a single primer layer on the rear face of the substrate.

11. The ophthalmic lens of claim 9, further defined as comprising an abrasion-resistant coating on both faces of the lens.

12. The ophthalmic lens of claim 11, further defined as comprising an anti-reflection coating on the abrasion-resistant coating of each of the faces of the lens.

13. The ophthalmic lens of claim 1, further defined as comprising an primer layer and an abrasion-resistant layer on both the front face and the rear face of the substrate.

14. The ophthalmic lens of claim 13, further defined as comprising an anti-reflection coating on the abrasion-resistant coatings.

15. A method for manufacturing an ophthalmic lens comprising:
   depositing a latex composition on at least one face of the organic glass substrate, wherein the latex composition comprises at least one polyurethane latex and at least one polyurethane crosslinking agent and is free of latex that includes butadiene units;
   curing the latex composition to form at least one impact-resistant primer layer; and
   depositing an abrasion-resistant coating on the impact-resistant primer layer.

16. The method of claim 15, wherein the latex composition is further defined as comprising at least one (meth)acrylic latex.

17. The method of claim 16, wherein the (meth)acrylic latex forms 10 to 90% total weight of latex present in the latex composition.

18. The method of claim 17, wherein the (meth)acrylic latex forms 10 to 60% total weight of latex present in the latex composition.

19. The method of claim 18, wherein the (meth)acrylic latex forms 40 to 60% total weight of latex present in the latex composition.

20. The method of claim 17, wherein the (meth)acrylic latex comprise styrene-acrylate copolymer latex.

21. The method of claim 15, wherein the crosslinking agent comprises 0.1 to 5% by weight of the latex composition.

22. The method of claim 15, wherein the crosslinking agent comprises at least one polyfunctional aziridine, (methoxymethyl)melamine resin, urea resin, carbodiimide, polyisocyanate, or blocked polyisocyanates.

23. The method of claim 15, wherein the latex composition is cured at a temperature of at least 70° C.

24. The method of claim 15, further comprising depositing an anti-reflection coating on the abrasion-resistant coating.

* * * * *